(12) United States Patent
Hood et al.

(10) Patent No.: US 7,409,814 B2
(45) Date of Patent: Aug. 12, 2008

(54) METHOD OF INITIATING AUTOMATIC FEED OF BALE WRAPPING MATERIAL

(75) Inventors: William A. Hood, Reasnor, IA (US);
Thomas R. Walmsley, Pella, IA (US);
Calvin D. Meinders, Pella, IA (US);
Jerry E. Bandstra, Pella, IA (US);
Thomas M. Duenwald, Pella, IA (US);
Shane A. Bollinger, Leighton, IA (US)

(73) Assignee: Vermeer Manufacturing Company, Pella, IA (US)

( * ) Notice: Subject to any disclaimer, the term of this patent is extended or adjusted under 35 U.S.C. 154(b) by 340 days.

(21) Appl. No.: 10/935,547

(22) Filed: Sep. 7, 2004

(65) Prior Publication Data

US 2006/0048481 A1 Mar. 9, 2006

(51) Int. Cl.
*B65B 11/04* (2006.01)
*B65B 57/04* (2006.01)
(52) U.S. Cl. .............................. 53/587; 53/399; 100/4; 56/341
(58) Field of Classification Search .................. 53/118, 53/176, 211, 399, 587–589, 590, 389.2, 389.4; 100/4, 5, 15, 76, 88, 89; 56/341, 344, DIG. 2
See application file for complete search history.

(56) References Cited

U.S. PATENT DOCUMENTS

| | | | |
|---|---|---|---|
| 4,173,112 A * | 11/1979 | Meiners ..................... | 56/341 |
| 4,366,665 A | 1/1983 | VanGinhoven et al. | |
| 4,407,113 A * | 10/1983 | Core ........................... | 56/341 |
| 4,580,398 A * | 4/1986 | Bruer et al. ................. | 56/341 |
| 4,599,844 A | 7/1986 | Clostermeyer | |
| 4,604,855 A | 8/1986 | Krone | |
| 4,686,812 A * | 8/1987 | Bruer et al. ................. | 53/118 |
| 4,697,402 A | 10/1987 | Anstey | |
| 4,729,213 A | 3/1988 | Raes | |
| 4,910,949 A | 3/1990 | Meyer | |
| 4,917,008 A | 4/1990 | van den Wildenberg | |
| 5,036,642 A | 8/1991 | Underhill | |
| 5,079,898 A * | 1/1992 | Springs et al. ............... | 53/399 |

(Continued)

FOREIGN PATENT DOCUMENTS

EP 0820691 1/1998

(Continued)

*Primary Examiner*—Thanh K. Truong
(74) *Attorney, Agent, or Firm*—Sturm & Fix LLP (57) ABSTRACT

Large cylindrical bales of hay, straw, or other forage or fodder are usually wrapped with a filament-type product, typically twine, or a sheet-type product, typically netwrap material, after a bale has reached a predetermined size. A method and apparatus are disclosed that permits the bale to continue to form during part of the wrapping process. A delay occurs between the initiation of the wrapping step and the alarm for the operator to stop the forward movement of the baler. By inserting the wrap material to an entry throat of the baler, new crop material may be added to the bale while the leading edge of the wrap material travels around the bale. The operator is notified only when the feed of additional crop material needs to be stopped for the wrapping operation to conclude. The present invention is applicable to the use of sheet or filament wrapping materials for binding round bales.

24 Claims, 6 Drawing Sheets

U.S. PATENT DOCUMENTS

| | | | | |
|---|---|---|---|---|
| 5,115,734 A | * | 5/1992 | Quartaert | 100/5 |
| 5,129,208 A | | 7/1992 | Van Zee | |
| 5,349,806 A | * | 9/1994 | Swearingen et al. | 56/341 |
| 5,551,218 A | * | 9/1996 | Henderson et al. | 53/504 |
| 5,855,109 A | | 1/1999 | Vande Ryse et al. | |
| 6,006,504 A | | 12/1999 | Myers | |
| 6,021,622 A | * | 2/2000 | Underhill | 53/118 |
| 6,164,050 A | | 12/2000 | Vande Ryse et al. | |
| 6,209,450 B1 | * | 4/2001 | Naaktgeboren et al. | 100/4 |
| 6,550,218 B2 | | 4/2003 | McClure | |
| 2003/0115841 A1 | * | 6/2003 | Davis et al. | 53/587 |

FOREIGN PATENT DOCUMENTS

| | | | |
|---|---|---|---|
| GB | 2159762 | * | 12/1985 |

* cited by examiner (Prior art)
Figure 1

METHOD OF INITIATING AUTOMATIC FEED OF BALE WRAPPING MATERIAL

TECHNICAL FIELD

The principles disclosed relate to improvements to round balers used for harvest of agricultural crops. More particularly, the invention relates to improved operation of the mechanism that feeds sheet type wrapping material such as netwrap or plastic, or filament type wrapping material such as, twine, to a formed cylindrical bale for wrapping the bale. The invention further relates to a method of operating the feed mechanism.

BACKGROUND

Round balers are well known, designed to form agricultural crops into cylindrical packages. All such balers include some type of mechanism for wrapping the formed bales with a wrap material including netwrap, which is a sheet material typically in the form of light, very thin web material, or twine, that is a filament. Round balers generally fall into two categories: fixed chamber balers or variable chamber balers. The fixed chamber balers generally include rollers or short sections of flat belts in fixed locations to define the bale chamber. This configuration provides many optional entry points for the wrapping material, provided at any transition between the rollers or belts.

Figure 1:
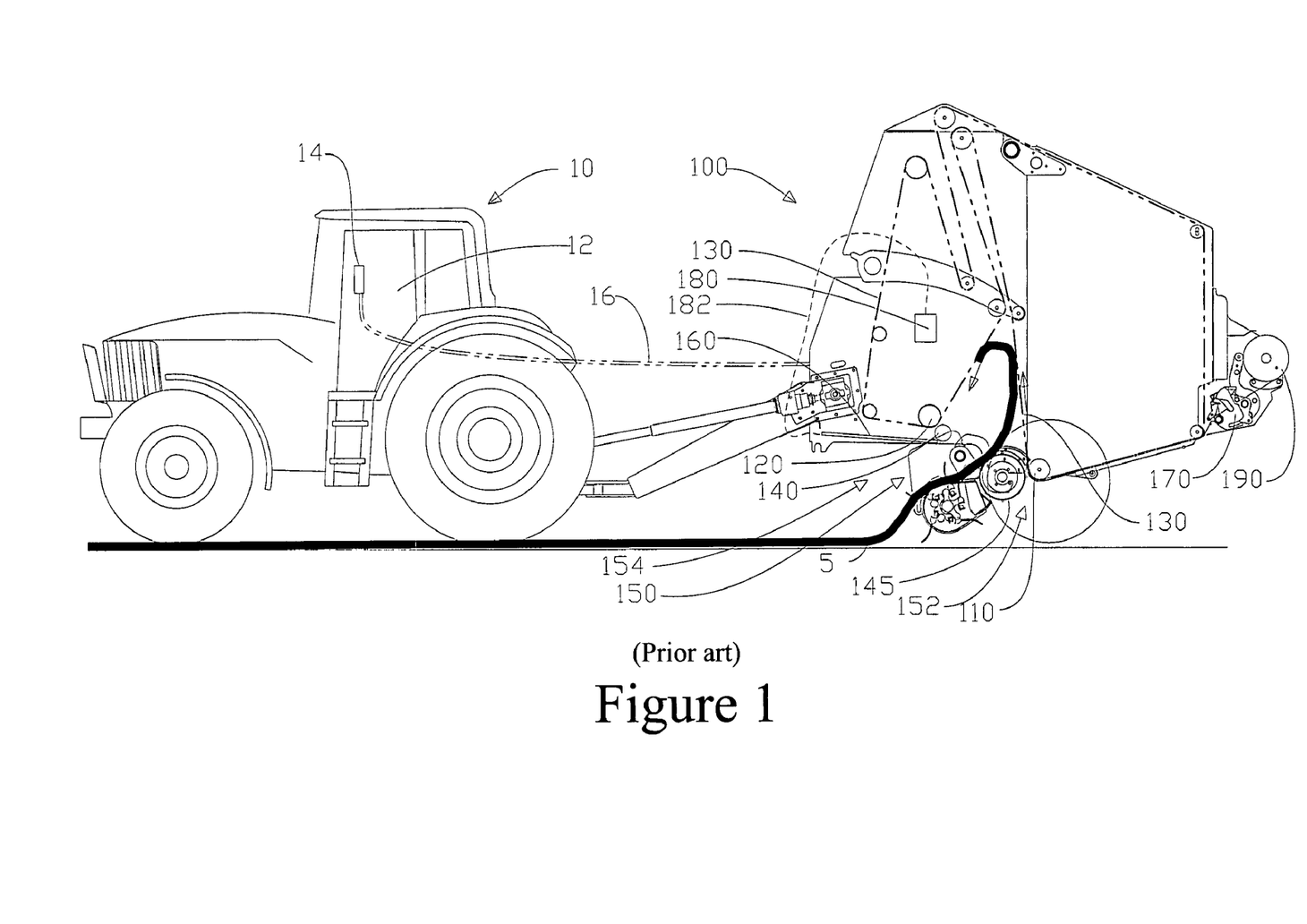
FIG. 1 is a prior art schematic of a cylindrical baler as it is towed by a tractor to feed crop material.

The variable chamber balers typically include flat belts that form a variable size bale-forming chamber, and the entry point for the wrapping material is generally limited to the in-feed area or throat. FIG. 1 is a schematic of a typical variable chamber baler 100, as disclosed in commonly assigned U.S. Ser. No. 10/719,460, Filed: Nov. 21, 2003 entitled NETWRAP FEED AND CUT MECHANISM herein incorporated by reference, connected to a towing vehicle, such as a tractor 10. The tractor 10 includes an operator station 12 where information related to the performance of the baler is typically communicated to an operator, with controller 14, which includes a display and audio alarm. In operation, the tractor 10 tows the baler across the ground to feed the crop material 5 to throat 150 defined by a bottom belt roller 110, and an upper roller 120; both supporting the bale forming belts 130. The throat 150 typically also includes other rollers such as a starting roller 140 and drum roller 145 that assist in moving the crop material. Many configurations are known, but each includes what can be defined as an entry side 152 and an exit side 154. The entry side 152 is to be defined by the travel direction of the bale forming belts and crop material 5. For instance in the example illustrated in FIG. 1, the bale forming belts 130 are illustrated to travel in a direction that the outer circumference of the forming bale will move in a counter-clockwise direction. The crop material 5 will enter the throat 150 and be moved toward the bottom belt roller 110 at the entry side 152 of the throat. Balers have been designed to rotate the forming bale in the opposite direction, in which case the entry side of the throat would be defined by the upper roller 120.

The exit side 154 of the throat is defined by the upper roller 120, the point at which the bale forming belts 130 leave contact with the outer circumference of the forming bale. Most variable chamber balers operate so that the bale rotates in this manner, and due to the configuration of the supporting frame, a twine mechanism 160 is typically located near the exit side of the throat as shown. The twine 182 is fed from a supply roll 180 through the twine mechanism 160, such that the loose end of the twine is inserted to the nip point where the formed bale contacts the bottom belt roller 110 or, in this case, drum roller 145, from above any incoming material 5. An alternative configuration example is shown in U.S. Pat. No. 4,502,646, by Meiers. In both cases, the twine will begin restraining the crop material in the throat area as soon as it begins to feed, and any material fed into the baler, after the twine has started to wrap the bale, will be located on top of the twine, and will not be restrained by the twine. Thus, the typical method of operation of the baler has required the operator to stop the forward travel of the tractor and baler, to discontinue feeding material into the baler, before the twine mechanism starts to apply twine to the bale. At times this operation was slightly modified by the operator, by continuing to feed material in to the baler during a portion of the wrap cycle as the loose end of the twine was initially inserted, to assist in restraining the twine to the formed bale. However if an excessive amount of hay were fed into the baler at the same time as the twine was being fed, the resulting amount of un-restrained hay would negatively affect the appearance of the resulting bale. Thus, the amount of time that both crop material and twine are fed is minimized, to reduce the amount of crop material on the outside of the twine.

A desirable bale will typically be wrapped with a significant amount of twine that was applied under significant tension. In order to produce a desirable bale, the twine mechanism will go through two basic movements:

1. wrap cycle initiation and
2. the wrap cycle.

The wrap cycle initiation consists of the first movement from a home position, where the twine tie mechanism is positioned to minimize contact with the incoming crop, to a start-feed position where the loose end is inserted to the nip point. The wrap cycle consists of the reverse motion where the twine tie mechanism moves slowly back to its home position. The twine tie actuators are typically simple mechanical components, not capable of operating at significantly different speeds. Thus, the wrap cycle initiation typically takes a significant amount of time.

The coordination of initiating feed of twine, with discontinuing feed of crop material will maximize productivity of the baling operation: i.e. if the feeding of crop material is stopped before the twine mechanism begins to operate, the baler will be rotating the bale for several seconds, during the wrap cycle initiation, with no incoming crop material and no twine feeding. Balers typically include a bale size sensor that provides a bale size signal that is transferred through wire harness 16 to controller 14. The controller 14 is also typically operatively connected to an actuator for the twine mechanism. When the bale has reached the desired size an alarm or signal is transmitted to the operator, indicating that the forward travel of the baler should be stopped, to stop feeding material into the baler, at the same time the twine tie actuator is energized to start the twine tie cycle. These events typically happen at the same time, or with some selectable time delay between the alarm and the start of the twine tie cycle. Selectable delays ranging from 0 to 5 seconds have been provided, to allow the operator to have time to stop the baler before the twine cycle starts, while minimizing the delay that would result if the operator were required to stop the baler and to initiate the twine tie cycle at the same time. The selectable time delay allows the operators to compensate for variations in ground speed, ground conditions, and tractor capability.

Netwrap mechanisms, for wrapping bales with netwrap material 190, have been developed to feed the wrapping material to either the entry side or the exit side of the throat. A netwrap mechanism 170 that feeds the wrapping material to the entry side is illustrated in FIG. 1. Other mechanisms are illustrated in H. D. Antsey et al. U.S. Pat. No. 4,697,402 and Van Zee U.S. Pat. No. 5,129,208 both of which are herein incorporated by reference, while a mechanism that feeds netwrap material 190 to the exit side of the throat is disclosed in Underhill U.S. Pat. No. 5,036,642.

In the arrangement that inserts the netwrap material 190 at the exit side, the inserted netwrap material 190 will cover any crop material 5 coming into the baler, as soon as it begins to feed onto the bale, similar to the function of the twine mechanism. In the arrangement that inserts the netwrap material 190 at the entry side, where the netting is inserted underneath any incoming crop material, the netting will not cover incoming material until the forming bale has made nearly a complete rotation, wherein the starting edge of the netwrap material 190 will move from the entry side of the throat, around the circumference of the bale, and back to the exit side of the throat, which can take between 3 and 10 seconds, depending on the bale size and speed of operation of the baler. With netwrap material 190 that covers the full length of the bale, the bale needs to rotate only one and one-half to two rotations to achieve acceptable coverage. Thus, the duration of the wrap cycle is very short.

Control systems for the netwrap function typically parallel that of the twine tie function, wherein there is a bale size sensor that provides a signal to the operator to stop the baler, while at the same time initiating the wrap cycle. With this control technique, crop material is not fed during any portion of the wrap cycle, including those portions where the mechanism is moving from the home position to a feed position, and where the wrap material is moving around the portion of the bale's circumference that does not affect the incoming crop material. The speed of the wrap cycle will affect the productivity of the baling operation, and can be evaluated by the amount of time that crop material is not being fed into the baler. There is an opportunity to improve baling productivity by providing a control system to minimize the time required to complete the bale wrapping process, by allowing crop material to feed during a portion of the wrap cycle.

There is a need, therefore, for a more efficient process for bale-wrapping wherein crop material may be fed into the bale during at least some of the bale-wrapping cycle without compromising the integrity of the resulting bale.

SUMMARY OF THE INVENTION

The present invention provides a method of operating a bale wrapping mechanism, to allow a portion of the tie cycle to be performed while crop material is being fed into the baler, in a manner that the cycle time is reduced.

An object of the present invention is to provide a method and apparatus for increasing the efficiency of the baling operation by permitting the bale to continue to be formed by allowing additional crop material to enter the bale, while the bale wrapping step is in progress.

An additional object of the present invention is to provide a method and apparatus wherein no crop material making up a cylindrical bale lies outside the bale's wrap material.

To effect these advantages, the baler is preferably configured such that the wrap material is inserted into the bale closer, in an angular sense, to the entry side of the round baler's throat than to the exit side of the round baler's throat. When the bale begins to be wrapped, the wrap material feeds out on top of the outer surface of the bale. Until the leading edge of the wrap material reaches the exit side of the throat, where the existing bale meets the incoming crop material, the wrap material lies on the outside of the bale. Therefore, during the time when the leading edge of the wrap material travels from the insertion point to the exit side of the round baler's throat, forward progress may be made by the round baler and additional crop material may be added to the bale.

An example of a process utilizing this invention is as follows. The cylindrical bale size, which can be a length dimension such as a diameter, or a weight, is continually sensed and compared to a predetermined size at which to begin wrapping the bale with wrap material. When the instantaneous bale size equals the predetermined size at which to begin wrapping the bale, a signal is given to the bale wrapping mechanism, the wrapping mechanism moves into position, and the wrapping process begins while material continues to be added to the bale.

When the leading edge of the wrap material reaches a point at which a predetermined duration of time will bring the leading edge of the wrap material to the exit side of the round baler's throat, a signal is given to the operator of the round baler to stop the forward progress of the round baler. The predetermined duration of time is intended to be sufficient for the operator to halt the forward progress of the baler before the leading edge of the wrap material reaches the exit side of the baler's throat. With no more crop material entering the round baler, the wrap material remains on the outside of the bale around the entire circumference of the cylindrical bale.

It is clearly seen how, in the above example, the objects of the instant invention are met.

DETAILED DESCRIPTION

Figure 2:
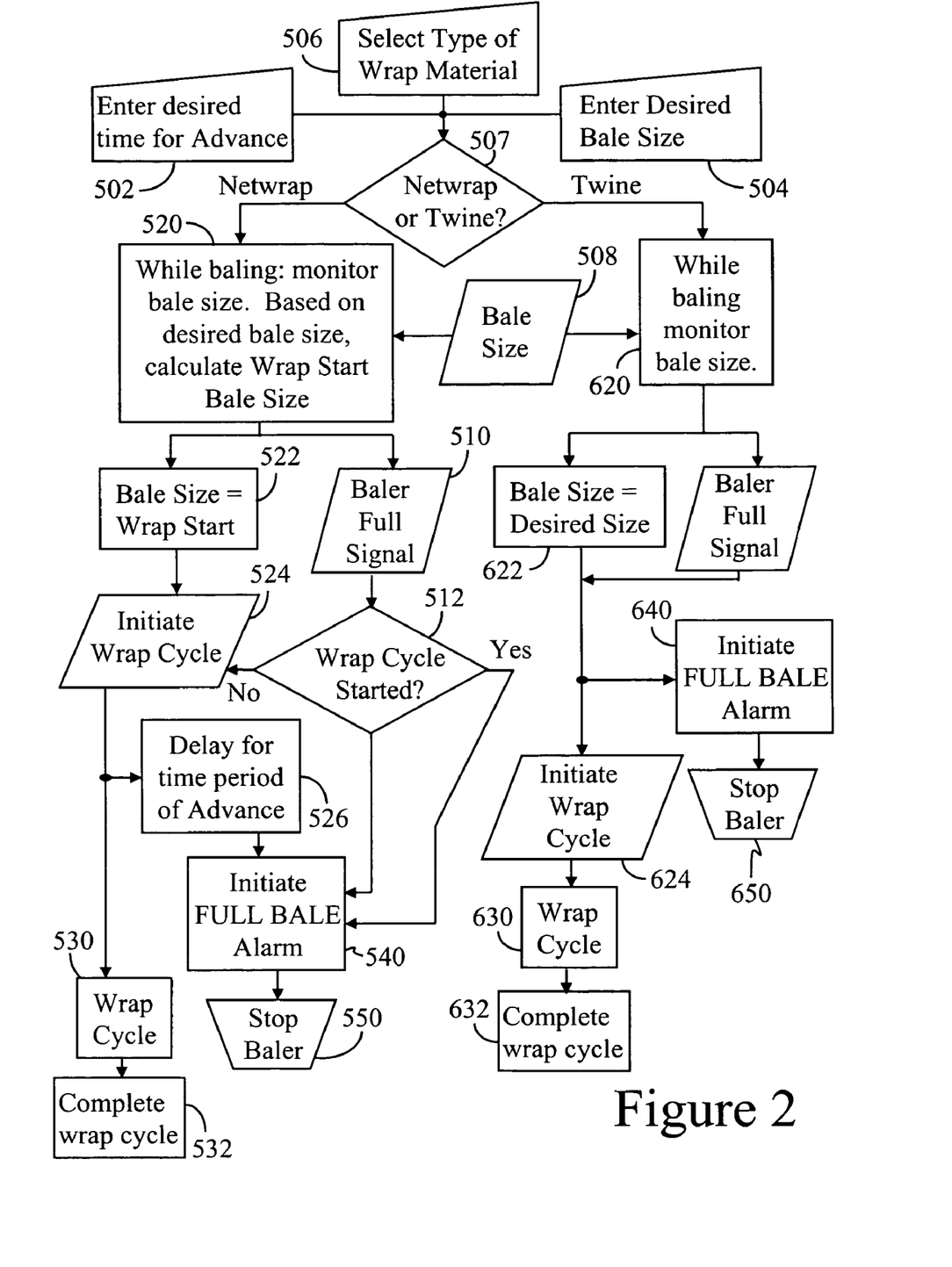
FIG. 2 is a flow chart showing the method of operation of the present invention.

FIG. 2 illustrates a flow chart of the method of operating a round baler for two different wrapping materials: filament, which will herein be referred to as twine but could include other types of filaments and sheet, which will herein be referred to as netwrap but could include other types of sheets including plastic. The method of operation of the present invention, for applying netwrap material 190, can be used with any type of round baler, including variable chamber balers 100 or fixed chamber balers. It is particularly useful for balers configured such that the netwrap material 190 is inserted closer to the entry side of the throat 152 than to the exit side of the throat 154. This relative location is defined by the direction of rotation of the baler, and is illustrated, in FIG. 5, referencing line 153 passing through the center of the bale 210 and the center of the throat 150, where any location in the rotational direction of arc $\alpha$ from the center of the throat 150 to 180° from the center of the throat 150 will be closer to the entry side 152 than to the exit side 154, while any location in the rotational direction of arc $\theta$ from 180° from the center of the throat 150 to the center of the throat 150 will be closer to the exit side than to the entry side As defined in FIG. 1, for the variable chamber baler 100, the insertion point is at the entry side of the throat 152, between the incoming crop material 5 and the entry side of the throat 152. For other types of balers, in which there are other wrap-entry points are utilized, this method would also be applicable.

In this application, the term bale size means a measurable, physical characteristic of the cylindrical bale. Examples of such measurable, physical characteristics are diameter and weight.

FIG. 2 further illustrates a separate method of operation for applying twine 182, similar to prior art techniques, with balers configured so that the twine 182 is inserted at the exit side of the throat 154. As described in the prior art description above, where there is no delay between the time the twine starts to wrap the bale, and the time the twine is restraining the crop material in the throat area, and where it is desirable to insure that that the twine will be installed on top of all the crop material, this method is intended to insure that the baler is stopped before twine begins to wrap the bale. Looking to FIG. 2, the method of operation of the wrap cycle begins when the operator selects an Advance Time at step 502, a Desired Bale Size at step 504, and type of wrap material at step 506. If netwrap material 190 is selected, the controller 14 will monitor and compare the bale size signal 508 to a calculated wrap start bale size at step 520.

The bale size signal 508 can be produced by any type of switch or sensor capable of measuring the bale size. A typical arrangement uses a bale diameter rotary potentiometer 220 (see FIG. 5) to measure rotation of a belt tensioner. The position of the rotary potentiometer 220 is related to the outer diameter of the bale. The output from the rotary potentiometer 220 or other bale size sensor is monitored by the control system, and a bale size display is provided to the operator. The operator can typically select a desired bale size 508, which is then defined as the full bale condition. The output from the bale diameter rotary potentiometer 220 is recognized by the controller 14 as the bale size 508 signal.

If the comparator block 507 detects that netwrap material 190 has been chosen as the wrap material by the operator in the material entry step 506, the process follows generally down the left hand side of FIG. 2. The wrap start bale size 520 can be the same as the desired bale size 504, or can be defined by the controller 14 to be slightly less than the desired bale size 504, to compensate for the amount of material that will be fed into the baler after the Full Bale alarm 540 is activated, as a result of the amount of time required for the operator to respond to the signal and to stop the forward travel of the baler.

At the comparator step 522, when the bale size is determined to be equal to the wrap start size, the wrap cycle is initiated at step 524. The wrap cycle 530 will be initiated, while a delay period with a duration equal to the Advance time 502 set previously by the operator, is implemented at step 526. After the delay period the Full bale alarm is activated at step 540, which will inform the operator to manually stop the forward travel of the baler at step 550, stopping the feed of crop material 5 to the baler. Such an alarm may be audible, visible, or a combination of the two. When the Advance time is set properly, the baler will stop at step 550 shortly before the wrap cycle is completed at step 532. With a netwrap system that feeds material to the incoming side of the throat 150, the time duration between stopping the baler at step 550 and completing the wrap cycle at step 532 can be minimal, and the productivity of the baling operation maximized.

This method allows the feed mechanism to complete its first process of feeding the netwrap material 190 from the storage location to the bale, and allows the netwrap wrap material 190 to travel from the entry side 152 of the throat 150, where it was inserted, to near the exit side 154 of the throat 150, before alerting the operator to stop feeding crop material 5. The time required for the netting material to reach the exit side 154 of the throat 150 will vary between machines, and will vary as a result of differing operating conditions, such as differing operating speeds. Thus, this embodiment allows the operator to select a delay period to match his conditions, at step 502. Ideally this delay will result in synchronizing the times that the netwrap material 190 arrives at the exit side 154 of the throat 150 and the time that crop material 5 stops feeding. In this manner, the time duration in which crop material 5 is not being fed into the baler is minimized, and productivity of the baler is maximized.

The delay period of step 526 provides the potential for an operator to continue feeding crop material into the baler, after the wrap cycle is started. If the desired bale size 504 is set close to the maximum bale size, and the delay period is set high, there is a possibility that the crop material will be fed at a rate such that the baler could be overfilled, before the full bale alarm is activated. Thus, a separate full bale signal 510 is monitored at step 512. If the full bale signal 510 is activated, the wrap cycle and full bale alarm will be immediately initiated at steps 524 and 540, respectively.

FIG. 2 also illustrates a traditional method of control when applying twine: if twine is selected at step 506 the bale size 508 will be monitored 620 by the controller 14, as described earlier. At step 622, when the bale size is equal to the desired size, the twine tie wrap cycle is immediately initiated at step 624. In order to insure the twine will be installed on top of all the crop material, the Full Bale Alarm is initiated simultaneously at step 640. The baler is stopped at step 650 while the wrap cycle 630 continues and terminates at step 632. As a result there is a significant amount of time between the point at which the baler is stopped at step 550, when no material is being fed into the baler, and the time the wrap cycle is complete, at step 632.

The method illustrated by steps 520 through 550, as described for application of netwrap above, could also be used for applying twine. The Advance time set at step 502 would allow the crop material to continue feeding while the twine tie mechanism was moving from its home position, to the position where the twine begins to wrap the bale. The appropriate advance time for operation with the twine tie may differ from the advance time for operation with netwrap. However, an operator could manually adjust the advance time when selecting between twine or netwrap, and both systems could be operated to utilize an advance time. When applying twine the delay would result in synchronizing the times that the twine 182 begins to feed and the time that crop material 5 stops feeding. In this manner, the time duration in which crop material 5 is not being fed into the baler is minimized, and productivity of the baler is maximized.

Figure 3:
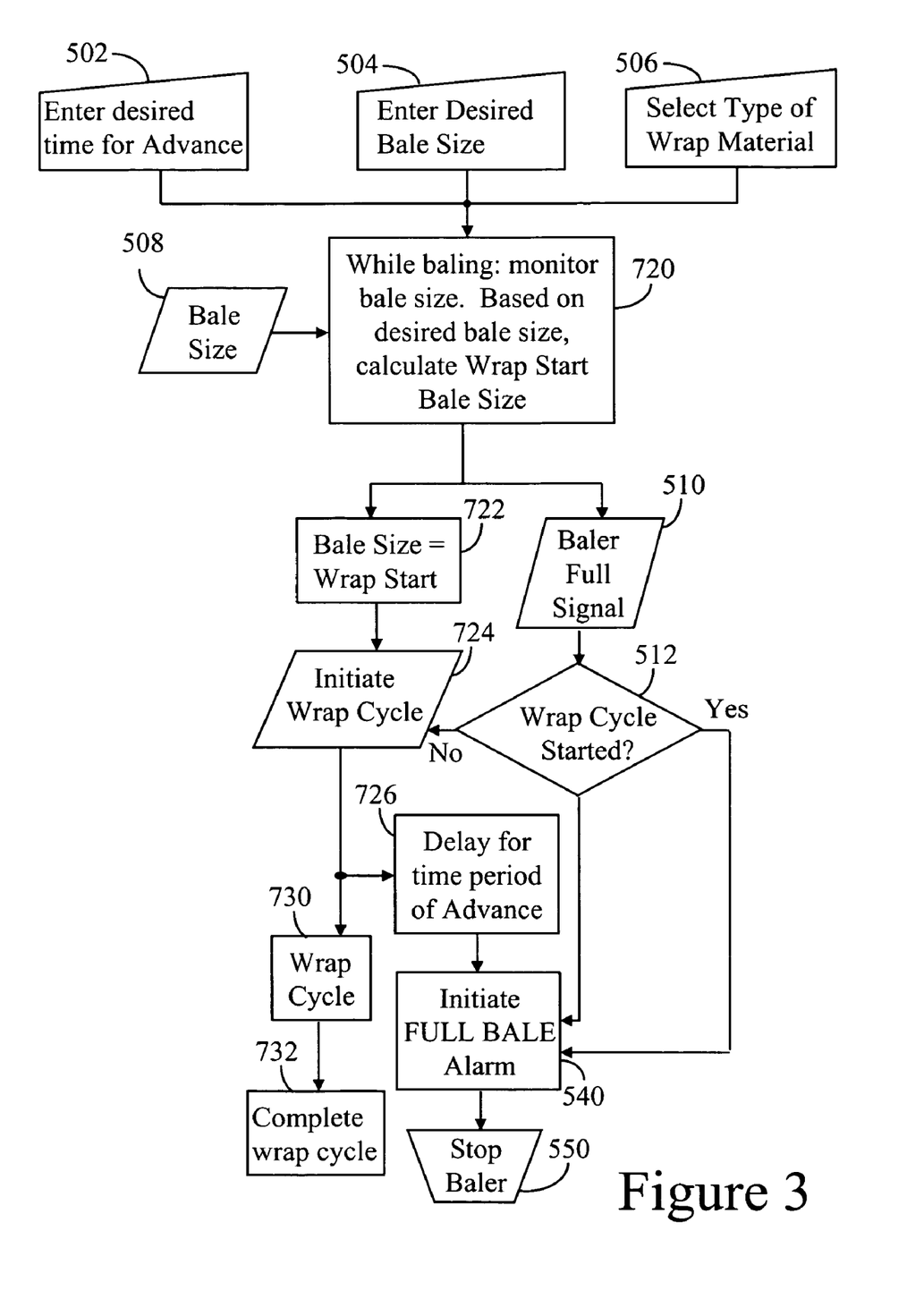
FIG. 3 is a flow chart showing an alternative method of operation of the present invention.

FIG. 3 illustrates an alternative embodiment of the method of the present invention, incorporating an advance time for both netwrap and twine, wherein the controller 14 will attempt to compensate for variations in the rate of crop material 5 flow to avoid instances of overfilling the baler, and to more accurately control the resulting bale size. In this embodiment the operator again makes three selections: Advance time at 502, Desired Bale Size at 504, and Type of Wrap Material at 506. The entered advance time could include a unique advance time for netwrap and a unique advance time for twine, or a single setting. Step 720 monitors the bale size signal 508 and calculates a dynamic wrap start bale size based on the rate of growth of the bale, the desired bale size and the selected type of wrap material, wherein the controller could automatically adjust to compensate between the characteristics of netwrap versus twine. Using this technique the controller will automatically compensate for variations in the crop material 5 rate of flow into the baler, which can result from variations in the ground speed of the baler and/or variations in the density of the windrow of the crop material. An alternative method of compensating for the bale formation speed includes calculating an average bale growth rate based on data recorded during recently formed bales 210 (see FIG. 5). Many other techniques can be developed, useful to establish a bale growth rate that can be used as a function to vary the dynamic wrap start size. The controller will continue monitoring the bale size signal 508 until the bale size equals the wrap start size at step 722, at which time the wrap cycle will be initiated at step 724. Similar to the sequence described in FIG. 2, a delay period with a duration equal to the Advance time set previously by the operator, is implemented at step 726. After the delay period the Full bale alarm is activated at step 540, which will inform the operator to manually stop the forward travel of the baler at step 550, stopping the feed of crop material 5 to the baler.

Figure 6:
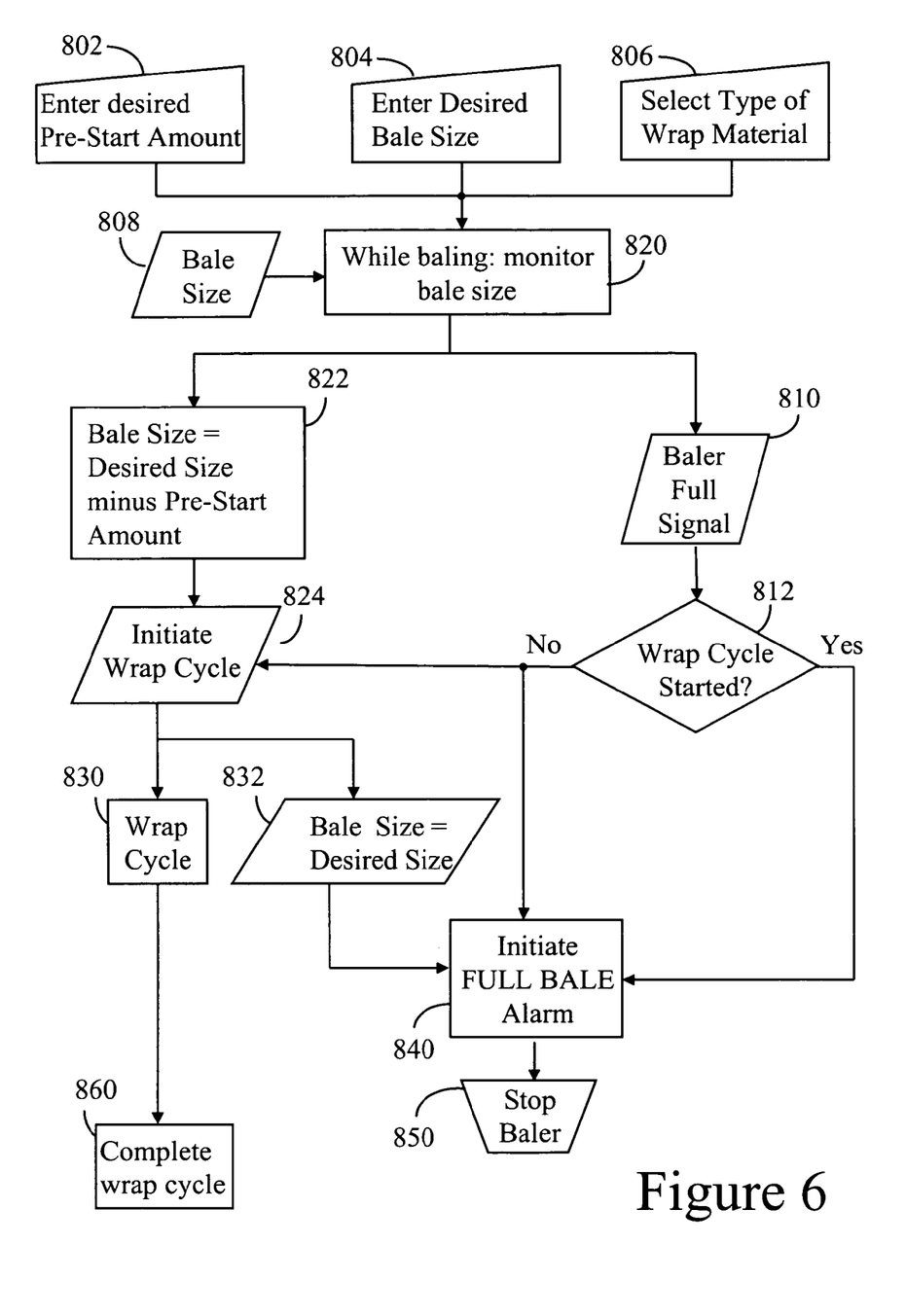
FIG. 6 is a flow chart showing an alternative method of operation of the present invention.

FIG. 6 illustrates an alternate embodiment of the present invention that does not utilize time duration as a variable in the control algorithm, wherein an operator will be able to specify a pre-start amount. The pre-start amount will be preferably be a numerical factor that correlates to the diameter of the bale; i.e. five may equate to five inches of bale diameter. This factor could correlate to other measurements of bale size, including bale weight. If the bale size is measured as weight, then the desired bale size and pre-start amount will also correlate to weight, while if the bale size is measured as a dimension, then the bale size and pre-start amount will also correlate to the diameter. The numerical value entered may indicate a percentage or a value with units such as inches or pounds.

In this embodiment the operator again makes three selections: Pre-Start Amount at 802, Desired Bale Size at 804, and Type of Wrap Material at 806. Step 820 monitors the bale size signal 808. The controller will continue monitoring the bale size signal 808 until the bale size equals the Desired Size minus the Pre-Start Amount at step 822. For instance, if the Desired Bale Size is correlated to a bale diameter and was set to sixty inches, and the Pre-Start Amount set to five inches, the wrap cycle will be initiated at step 824 after the Bale Size=fifty-five inches, as detected at step 822.

In parallel, the baler full signal will be monitored continually at step 810 in the event there is a malfunction of the bale size mechanism, and will immediately initiate a wrap cycle and full bale alarm if a bale full signal is detected at step 812.

The operator will adjust the Pre-Start Amount to a value that matches expectations, as affected by the baling rate and the amount of crop material in the windrow. As long as the Baler Full Signal has not been detected, the Full Bale alarm will be activated at step 840, after the Bale Size equals the Desired Size as detected at step 832, and after the wrap cycle has been initiated at step 824. The operator will then stop the forward travel of the baler at step 850, stopping the feed of crop material 5 to the baler, and the wrap cycle will complete at step 860.

Figure 4:
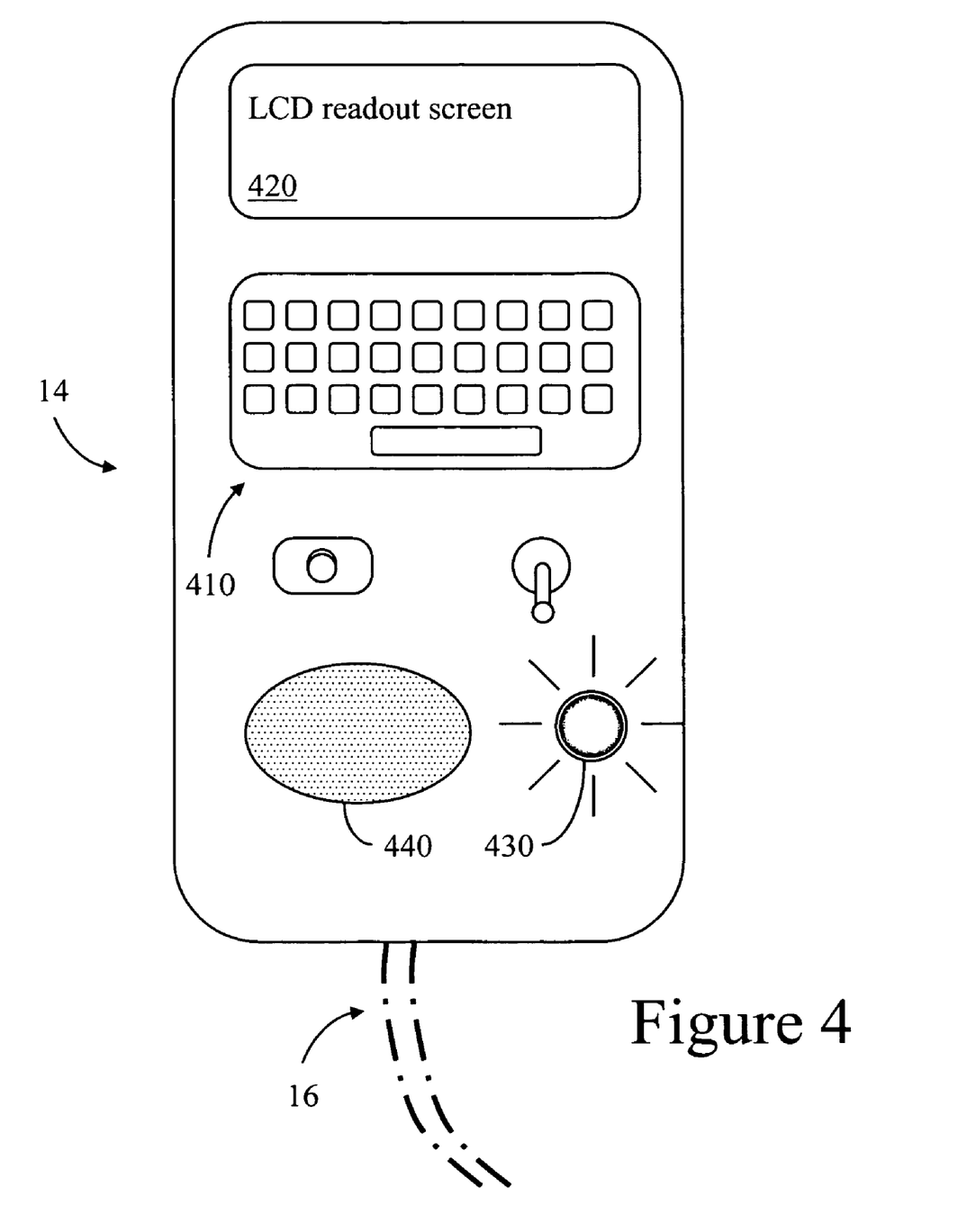
FIG. 4 is an elevation view of the controller.

In FIG. 4, the controller 14 is shown. The controller 14 has a keypad 410 for entering the advance time or pre-start amount, desired bale size, type of wrap material, and other operator inputs. A Liquid Crystal Display (LCD) 420 facilitates the entry of data and choices. Alarms and notices may be expressed visually, via a light 430 and/or audibly, via a speaker 440.

Figure 5:
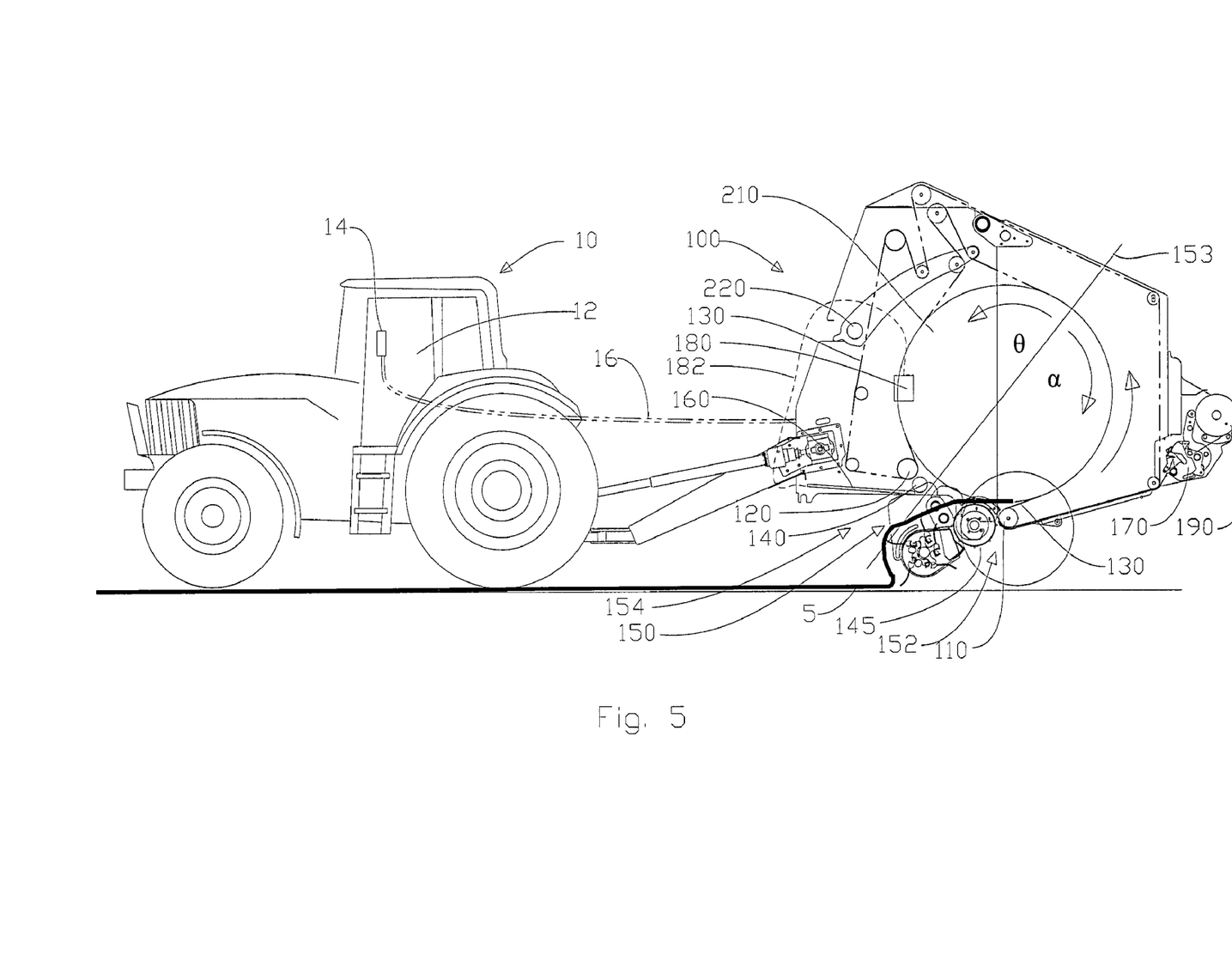
FIG. 5 is a side elevation view of the baler showing a bale being formed.

A bale 210 is shown being formed inside a variable chamber baler 100 in FIG. 5. The wrap material 190 is fed into the variable chamber baler 100 close to the entry side 152 of the throat 150.

With regard to the forgoing description, it is to be understood that changes may be made in detail, especially in matters of the types of sensors employed and the complexity of techniques useful for adjusting the delay period. For instance, the delay period at step 526 and 726 could be dependent on a physical measurement of the amount of netwrap material 190 that is dispensed from the supply roll, or a physical measurement that the netwrap material 190 has reached a certain point around the formed bale. Variations in controlling the delay period do not depart from the scope of the present invention. It is intended that these specific and depicted aspects be considered exemplary only, with a true scope and spirit of the invention be indicated by the broad meaning of the following claims.

The invention claimed is:

1. A method of operating a round baler to receive incoming crop material at a crop material entry throat as the round baler is moved along a ground, and to form the crop material into a cylindrical bale, wherein a bale forming process terminates after a movement of the baler along the ground is stopped, causing the crop material flow into the crop material entry throat to stop, the method comprising:
   (a) sensing a condition where the round baler has formed the cylindrical bale of a predetermined value of a physical characteristic of the bale;
   (b) initiating a wrap cycle where a wrap feed mechanism moves to begin feeding wrap material into the round baler to wrap the cylindrical bale;
   (c) initiating a delay of a predetermined period of time; and
   (d) initiating a stop signal to signal an operator to stop feeding crop material into the round baler, where the stop signal is initiated after a termination of the predetermined period of time.

2. The method of claim 1 additionally comprising:
constructing the round baler with a frame, baler sides and rollers, ends of the crop entry throat defined by the baler sides;
inserting crop material into the baler, an entry side of the crop material entry throat defined by the incoming crop material which will move toward the entry side, the entry side further defined by a first roller, an exit side of the crop material entry throat defined by a second roller, the wrapping mechanism defined by a wrap material feed system; and
positioning the wrap material feed system to feed the wrap material between the incoming crop material and the entry side of the crop material entry throat.

3. The method of claim 2 wherein the round baler includes two wrapping mechanisms, a first mechanism positioned to feed the wrap material between the incoming crop material and the entry side of the throat, and a second mechanism positioned to feed the wrap material between the exit side of the throat and the incoming crop material wherein the method further includes varying the delay period in response to selection of either the first or second wrapping mechanisms.

4. The method of claim 1 wherein the delay period of time is adjustable by the operator.

5. The method of claim 1 wherein the delay period of time is automatically adjusted as a function of a rate of growth of the cylindrical bale.

6. The method of claim 1 wherein the delay period of time is automatically adjusted as a function of an average rate of growth of previous bales.

7. The method of claim 1 wherein the delay period of time is automatically adjusted as a function of a type or wrap material selected.

8. The method of claim 1 wherein the round baler includes two wrapping mechanisms, a first mechanism to feed a sheet-type wrap material, and a second mechanism positioned to feed a filament type wrap material wherein the method further includes varying the delay period in response to selection of either the first or second wrapping mechanisms.

9. The method of claim 1 wherein the physical characteristic of the cylindrical bale comprises a value related to a diameter of the cylindrical bale.

10. The method of claim 1 wherein the physical characteristic of the cylindrical bale comprises a weight of the cylindrical bale.

11. A method of baling crop material with a round baler operated by an operator and having a mechanism for inserting wrap material for wrapping an outer surface of a bale, the method comprising:
    (a) initiating an insertion of the wrap material to begin wrapping the outer surface of the bale;
    (b) waiting a predetermined delay time after initiating the insertion of the wrap material; and
    (c) signaling the operator after the predetermined delay time to stop a feed of the crop material into the round baler.

12. The method of claim 11 wherein initiating the insertion of the wrap material comprises initiating the insertion of a filament type wrapping material.

13. The method of claim 11 wherein initiating the insertion of the wrap material comprises initiating the insertion of sheet-type wrapping material.

14. The method of claim 11 additionally comprising detecting a predetermined bale size before initiating the insertion of the wrap material.

15. The method of claim 14 wherein the predetermined bale size is fixed.

16. The method of claim 14 wherein the predetermined bale size is variable during operation of the round baler.

17. The method of claim 16 including calculating the predetermined bale size as a function of operating conditions.

18. The method of claim 17 wherein the operating conditions used to calculate the predetermined bale size comprise a rate of flow of the crop material into the round baler.

19. The method of claim 18 additionally comprising using the rate of flow of the crop material from at least one previous bale to calculate the predetermined bale size.

20. The method of claim 11 wherein signaling the operator comprises initiating a visible alarm.

21. The method of claim 11 wherein signaling the operator comprises initiating an audible alarm.

22. A method of operating a round baler to receive incoming crop material at a crop material entry throat as the round baler is moved along a ground, and to form the crop material into a cylindrical bale, where a bale forming process terminates after a movement of the baler along the ground is stopped, causing the crop material flow into the crop material entry throat to stop, the method comprising:
    (a) sensing a condition where the round baler has formed the cylindrical bale to a first predetermined value of a physical characteristic of the bale;
    (b) initiating a wrap cycle where a wrap feed mechanism moves to begin feeding wrap material into the round baler to wrap the cylindrical bale while crop material is being fed into the baler; and
    (c) initiating a stop signal to signal an operator to stop feeding crop material into the round baler, where the stop signal is initiated after the sensed condition of the bale physical characteristic reaches a second predetermined value.

23. The method of claim 22 wherein the physical characteristic of the cylindrical bale comprises a value related to a diameter of the cylindrical bale.

24. The method of claim 22 wherein the physical characteristic of the cylindrical bale comprises a weight of the cylindrical bale.

* * * * *